United States Patent [19]

Vlasbloem

[11] Patent Number: 4,956,557

[45] Date of Patent: Sep. 11, 1990

[54] DOSIMETER FOR IONIZING RADIATION

[75] Inventor: Hugo Vlasbloem, Maasland, Netherlands

[73] Assignee: B.V. Optische Industrie 'De Oude Delft', Delft, Netherlands

[21] Appl. No.: 311,107

[22] Filed: Feb. 15, 1989

Related U.S. Application Data

[63] Continuation-in-part of Ser. No. 931,539, Nov. 14, 1986.

[30] Foreign Application Priority Data

Nov. 15, 1985 [NL] Netherlands ........................ 8503153

[51] Int. Cl.[5] ........................ G21K 1/04; G01T 1/185

[52] U.S. Cl. .............................. 250/385.1; 250/354.1; 378/145

[58] Field of Search .................. 250/358.1, 374, 354.1; 378/108, 145, 160

[56] References Cited

U.S. PATENT DOCUMENTS

| | | | |
|---|---|---|---|
| 4,057,728 | 11/1977 | Peschmann et al. | 250/374 |
| 4,264,816 | 4/1981 | Walenta | 250/385.1 |
| 4,553,062 | 11/1985 | Ballon et al. | 250/385.1 |
| 4,675,893 | 6/1987 | Duinker et al. | 375/145 |
| 4,751,391 | 6/1988 | Eberhard et al. | 250/385.1 |
| 4,859,855 | 8/1989 | Vlasbloem | 250/385.1 |

*Primary Examiner*—Constantine Hannaher
*Assistant Examiner*—Edward J. Glick
*Attorney, Agent, or Firm*—Louis E. Marn

[57] ABSTRACT

There is disclosed a dosimeter to be used in connection with slit radiography and comprised of a gas filled chamber with one side wall provided with a plurality of X-ray transparent strip-like electrodes extending substantially transversely to a longitudinal direction of the oblong-shaped casing and another side wall provided with wire electrodes extending parallel to such longitudinal direction of the oblong-shaped casing wherein each of the strip-like electrodes generates a signal representative of intensity of ionizing radiation and wherein the strip-like electrodes are divided into a number of groups, signals from the strip-like electrodes belonging to each group are combined to provide a control signal for a respective attenuation element.

32 Claims, 2 Drawing Sheets

FIG. 1
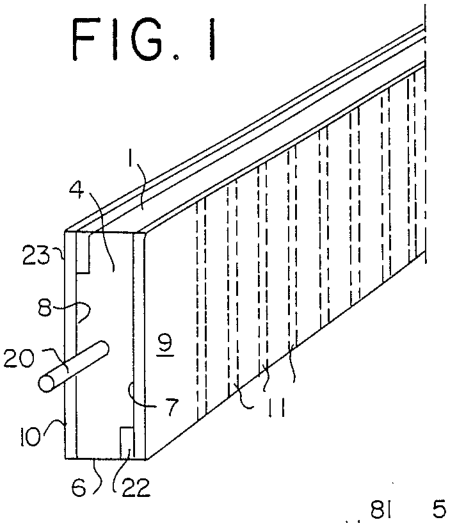
FIG. 2
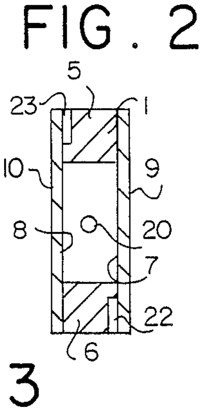
FIG. 3
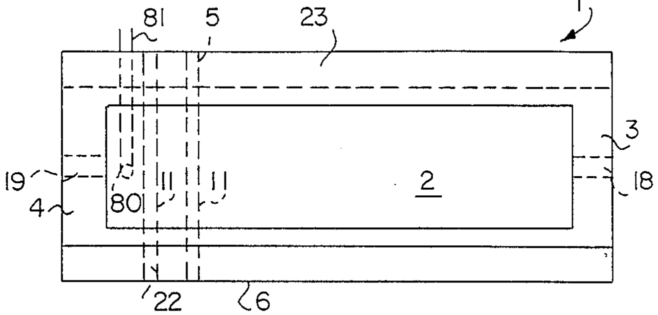
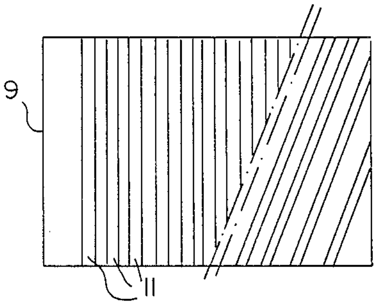
FIG. 4
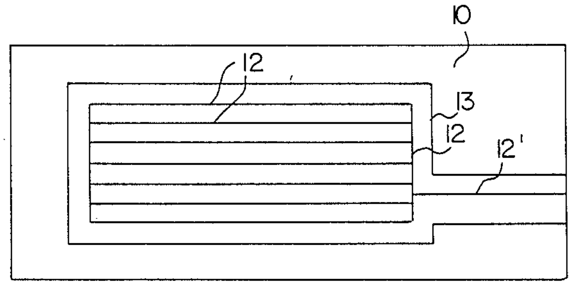
FIG. 5

FIG. 6
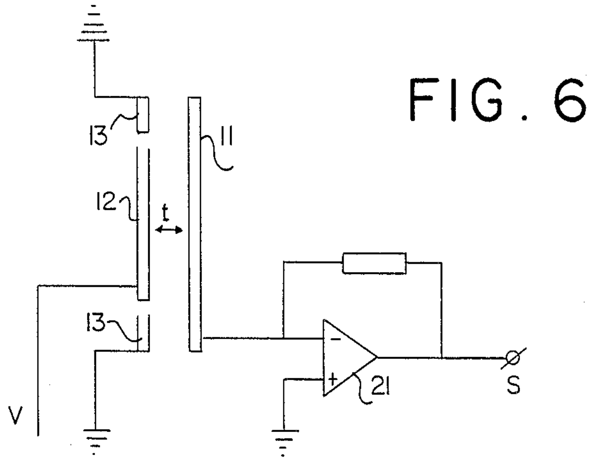
FIG. 7
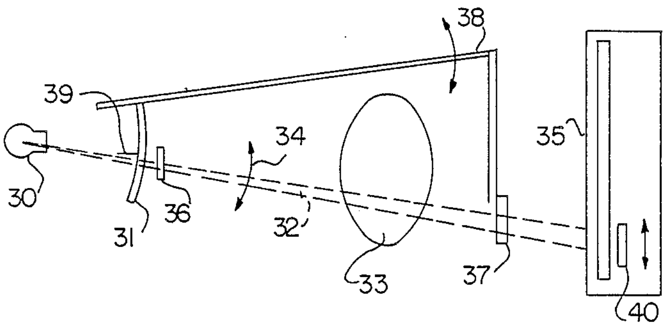
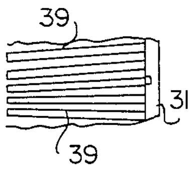
FIG. 8

DOSIMETER FOR IONIZING RADIATION

BACKGROUND OF THE INVENTION (1) Related Application

This is a continuation-in-part application of U.S. application Ser. No. 06/931,539, filed Nov. 14, 1986.

(2) Field of the Invention

This invention relates to a dosimeter for slit radiography, and more particularly to a dosimeter for slit radiography to control radiation intensity during scanning of a body.

(3) Brief Description of the Prior Art

A dosimeter for use in a slit radiography apparatus is described in European patent application No. 155064 and is comprised of a common electrode and a number of needle-like electrodes opposite the common electrode extending into the planar X-ray beam. The needle-like electrodes point in a direction parallel to the scanning direction and give rise to a visible X-ray shadow in the ultimate radiograph.

Dosimeters, as such, are known from the Handbook on Synchrotron Radiation, volume 1A, pages 323–328 by Ernst Eckhard Koch, published by North Holland Publishing Company, Amsterdam, N.Y., Oxford, 1983. A problem with such dosimeters, as described therein, is that application thereof is not readily usable in slit radiography equipment, where it is necessary to measure and regulate the quantity of radiation per diaphragm section transmitted through the diaphragm slit at any instance during the production of a radiograph without giving rise to a visible X-ray shadow image of the dosimeter itself in the radiograph.

In Nuclear Instruments and Methods 133 (1976) 409–413, there is described a pulse counter showing some similarities to a dosimeter in that an oblong gas filled chamber is enclosed by side walls having electrodes thereon. The pulse counter described is designed to count the number of heavy ion particles that enter or pass through the counter. As is usual in pulse counters, measures have been taken to create a continuous gas flow through the gas filled chamber. The pulse counter described is designed to have good temporal and hardly any spatial resolution for heavy ion particles. If and how it could function in detecting single X-ray photons let alone X-ray dosage is not described in the article.

Pulse counters like the one described are unfit to be used as dosimeters for X-rays because ionization chamber dosimeters measure current resulting from a number of photons is so great that a pulse counter would be totally overloaded. Current in a dosimeter is proportional to intensity of radiation whereas in a pulse counter current during pulses has no relation to intensity of radiation. Pulse counters, as the one described in the Nuclear Instruments article, are also less fit for use in a slit radiography apparatus because of the additional equipment needed to maintain gas flow.

In the abstract JP-A-57l0477 of Patent Abstracts of Japan 6 (1982) no.7, (P-143) 948, there is described a square X-ray dosimeter comprised of one large area dosimeter covering the whole area of the device as well as within the same housing back to back with the large area dosimeter there is provided a small area dosimeter covering a fraction of the area of the device. Such dosimeter does not have any spatial resolution and thus, is unfit to be used in slit radiography apparatus.

OBJECT OF THE INVENTION

An object of the present invention is to provide an improved method and apparatus for slit radiography including an improved dosimeter.

Another object of the present invention is to provide an improved method and apparatus for slit radiography including an improved dosimeter for effecting the production of improved radiographs.

SUMMARY OF THE PRESENT INVENTION

These and other objects of the present invention are achieved by a dosimeter to be used in connection with slit radiography and comprised of a gas filled chamber with one side wall provided with a plurality of X-ray transparent strip-like electrodes extending substantially transversely to a longitudinal direction of the oblong-shaped casing and another side wall provided with wire electrodes extending parallel to such longitudinal direction of the oblong-shaped casing wherein each of the strip-like electrodes generates a signal representative of intensity of ionizing radiation and wherein the strip-like electrodes are divided into a number of groups, signals from the strip-like electrodes belonging to each group are combined to provide a control signal for a respective attenuation element.

BRIEF DESCRIPTION OF THE DRAWINGS

The invention will be described below in more detail with reference to the accompanying drawings of an exemplary embodiment, wherein;

FIG. 1 shows a perspective view of a part of an embodiment of a dosimeter to be used in a slit radiography apparatus;

FIG. 2 shows a cross-sectional view of the dosimeter of FIG. 1;

FIG. 3 shows a plan view of a frame for a dosimeter;

FIG. 4 shows a first cover plate for the frame of a dosimeter;

FIG. 5 shows a second cover plate for the frame of the dosimeter;

FIG. 6 shows the electrical circuit of the dosimeter;

FIG. 7 illustrates a schematic application of the dosimeter in slit radiography apparatus; and FIG. 8 is a partial enlarged plan vie of attenuating elements.

DETAILED DESCRIPTION OF THE DRAWING

FIG. 1 shows in perspective an exemplary embodiment of a dosimeter according to the present invention. The dosimeter comprises an oblong, in this example, substantially rectangular, frame 1 which surrounds an oblong, in this example substantially rectangular, cavity 2 (FIG. 3). The frame has two short limbs 3, 4 and two long limbs 5, 6 and may be manufactured, for example from a flat plate of a suitable insulating material, such as glass or acrylic resin, so that the side surfaces of the limbs jointly define two parallel side faces 7 and 8.

Cover plate 9 and 10 are made of a suitable insulating material, such as glass or acrylic resin and are mounted in a vacuum-tight manner, for example by gluing, against the side faces 7 and 8. With the cover plates, the frame forms a sealed casing which contains an oblong measuring chamber 2.

On the surfaces of the cover plates facing each other, there are disposed electrodes between which an electrical field exists during operation. On the inner surface of the one plate 9, there is disposed, uniformly distributed over the length of the measuring chamber 2, a number of strip-like electrodes 11 of a conducting material extending substantially transversely or obliquely, as illustrated on the right side thereof, same to a longitudinal direction of the measuring chamber. This is also shown in FIG. 4 showing the inner surface of the plate 9.

On the inner surface of the plate 10, there is disposed a plurality of wire electrodes 12 interconnected and disposed essentially lengthwise in the longitudinal direction of the dosimeter. With respect to the configuration of the electric field between the electrodes 12 and the electrodes 11, the electrical sense act substantially as one single filled area electrode. However, physically, the metal of metal electrodes is less transparent to X-ray radiation than glass, acrylic or other insulating material of cover plates 9 and 10. The plate 10 having electrodes 12 disposed on its inner surface thereby as a whole is more transparent to X-ray radiation than a plate 10 provided with a single filled area electrode.

In the embodiment shown in FIG. 5, the wire electrodes 12 are surrounded by a guard electrode 13 extending about the edges of the plate 10 and disposed on the inner surface of the plate 10. The guard electrode 13 is interrupted on at least one position to allow a connecting section 12′ for the electrodes 12 to extend to the edge of the plate 10.

The measuring chamber is filled with a suitable gas which can be ionized by the radiation to be measured. Such a suitable gas is, for example, xenon.

In order to be able to fill the measuring chamber with the gas and to be able to evacuate it beforehand, there are disposed, at two positions in the example shown, holes 18 and 19 in the short limbs of the frame, in which holes 18 and 19, small tubes of, for example, copper are placed. Such a small tube is indicated in FIG. 1 by 20. After the measuring chamber has been evacuated via the small tubes and then filled with the gas, the small tubes are sealed in a vacuum-tight manner, for example by pinch sealing and soldering.

The electrodes may be formed, for example, by deposition of a suitable conducting material by evaporation, the areas which are not to be covered with electrode material being temporarily masked. In a practical embodiment, with a casing manufactured from acrylic, the electrodes are formed by depositing a thin layer of nickel having a thickness of approximately 1 μm at the required positions by means of sputtering technique. Such electrodes do not attenuate, or virtually do not attenuate X-ray radiation. In a practical embodiment, the measuring chamber had a length of approximately 42 cm and a height of approximately 3.5 cm, and 160 strip-like electrodes having a pitch of approximately 2.54 mm with a gap between them of approximately 1 mm. The total thickness of the dosimeter is approximately 10 mm.

The strip-like electrodes 11 may serve as anode strips, in which case the wire electrodes 12 are connected as a cathode. However, it is also possible to connect the strip-like electrodes 11 as cathode strips; the wire electrodes 12 are then connected as an anode. Such a circuit is shown diagrammatically in FIG. 6.

In FIG. 6, a positive voltage is applied to the electrodes 12, which is in this case the anode. The guard electrode 13 is grounded and serves to discharge any leakage currents. Depending on the specific application of the dosimeter, the cathode strips 11 are connected jointly or per group or separately to an associated amplifier 21; which provides, at an output terminal S, the amplified measurement signal produced by ionization of the gas in the measuring chamber under the influence of, for example, X-ray radiation.

If xenon is used as the gas filling of the measuring chamber, the anode-cathode voltage may be chosen in the flat region of the current-voltage characteristic which is valid for gases. Such a characteristic gives the relationship between the anode-cathode for a certain constant dosage of radiation and the signal current which appears as a result of the ionizing radiation. In the flat region, the signal current is virtually independent of the anode-cathode voltage so that the signal current depends exclusively on the number of quanta of ionizing radiation received. If xenon is used, it is possible to work in this region because xenon has a relatively high absorption factor (large photon cross-section) for ionizing radiation and provides an adequately high signal current even in the flat region of the current-voltage characteristic. It is therefore not necessary to employ a higher anode-cathode voltage in the so-called gas multiplication region. An advantage of this is that the setting of the anode-cathode voltage is not very critical. The anode-cathode voltage V may be, for example, 600 V.

Another advantage of the dosimeter described is that, as a result of the chosen configuration, the field lines of the electrical field between the anode and cathode electrode(s) extend essentially perpendicularly between the plates 9 and 10. As a result, the output signals of the dosimeter are virtually independent of the distance between the two plates, and thus, the dosimeter is insensitive to variations in atmospheric pressure.

The electrodes may be connected electrically in a simple manner by making the plates 9 and 10 somewhat larger than the frame so that one of the long edges, over which the electrodes then have to continue, of the plates 9 and 10 extend outside the frame. The electrical connections may then be produced, for example, by means of a suitable connector which can be pushed over the projecting edge of the plate.

Although the plates 9 and 10 in the exemplary embodiment shown are equally as large as the frame, recesses 22 and 23, respectively, are formed along two outermost longitudinal edges of the frame situated diagonally opposite each other, which recesses extend over the whole length of the frame, so that the same effect is achieved.

FIG. 7 illustrates possibilities of application of the dosimeter of the present invention in slit radiography equipment. It is pointed out that the dosimeter may also be applied in other situations and is, in particular suitable, in general, for detecting the distribution and variation of the intensity of ionizing radiation over an extensive region and is in particular suitable for performing detection without substantially affecting radiation to be detected. If only the total dosage of ionizing radiation is of interest in the measurement region, the signals from the strip-like electrodes can be added together or the strip-like electrodes can be connected together.

FIG. 7 shows diagrammatically slit radiography equipment having an X-ray source 30 which can irradiate a body 33 to be investigated with a flat X-ray beam 32 having a scanning movement indicated by an arrow 34 via a slit diaphragm 31 in order to form an X-ray image by means of an X-ray detector 35 placed behind the body. If it is only desired to determine the total X-ray dosage to which the body 33 is exposed during one or more scanning movements, the dosimeter may be disposed in the vicinity of the slit diaphragm or even against the slit diaphragm, as shown diagrammatically at 36.

The output from the dosimeter cannot than be used, however, to control the quantity of radiation transmitted locally through the slit diaphragm in order to obtain an equalized radiograph, as described in Dutch patent application No. 8,400,845. For this purpose, the dosimeter has to be situated, as indicated at 37, between the body 33 and the X-ray detector 35 and obviously tracks the scanning movement of the X-ray beam 32. The dosimeter may be mounted, for example, on an arm 38 which moves synchronously with the slit diaphragm. The output signals from one strip-like electrode at a time or from a number of strip-like electrodes situated next to each other provide a measure of the radiation intensity prevailing instantaneously in the associated sector of the X-ray beam and, therefore, also of the brightness of the part of the radiograph to be produced corresponding to the sector. The output signals can thus be used to control attenuating elements 39 which interact with the corresponding section of the slit diaphragm in order to achieve image equalization.

In order to prevent large differences between the output signals of (sets of) strip-like electrodes of the dosimeter which interact with adjacent sections of the slit diaphragm, the output signal from each set of strip-like electrodes belonging to a certain diaphragm section or, if one strip-like electrode is present for each diaphragm section, from each strip-like electrode may be combined, if desired, with the output signal from one or more strip-like electrodes belonging to adjacent sections of the slit diaphragm, in order to obtain the control signal for the section concerned.

In a practical embodiment a dosimeter according to the present invention may contain for example 160 anode wires. If the slit diaphragm has, for example, twenty controllable sections, eight strip-like electrodes are available per section. The signals from the eight electrodes are then combined into a control signal for the associated diaphragm section. However, as described above, the output signals of one or more adjacent electrodes belonging to adjacent sections might also be additionally involved in the formation of the control signal.

Depending on the type of X-ray detector used, it is possible, as an alternative, to control the attenuation elements on the basis of the radiation transmitted by the X-ray detector 35. The dosimeter may then be positioned behind the X-ray detector, as indicated at 40, and must therefore move synchronously with the scanning movement of the X-ray beam 32. In any case, it is an advantage that a dosimeter according to the present invention be constructed with a very small thickness, in the order of 10 mm or less.

Despite the fact that very thin strip-like electrodes may be used, there is the risk that the electrodes may give rise to spurious signals in the form of thin strips in the radiograph to be produced depending on the electrode material used. If desired, this can be prevented by ensuring that the strip-like electrodes extend somewhat obliquely with respect to the scanning direction. This can be achieved in a simple manner by mounting the dosimeter itself somewhat obliquely with respect to the scanning direction or by mounting the strip-like electrodes at a small angle with respect to the centre line of the dosimeter. It is pointed out that if nickel electrodes, as described above are used, no troublesome spurious signals occur.

While the invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. A dosimeter for ionizing radiation comprising a casing defining a gas-filled measuring chamber in which there is provided electrode elements and wherein said casing is provided with at least one entry window for the ionizing radiation, characterized in that said casing is of an oblong shape defining an oblong measuring chamber, said casing including at least two opposed side walls of a material transparent to ionizing radiation, an inner surface of one side wall being provided with wire electrodes extending essentially longitudinally to said oblong measuring chamber and an inner surface of another side wall being provided with a plurality of strip-like electrode elements essentially transversely to said oblong measuring chamber.

2. The dosimeter according to claim 1 wherein said casing includes an oblong frame mounted in gas-tight relationship to said side walls.

3. The dosimeter according to claim 2 wherein said casing is manufactured from glass.

4. The dosimeter according to claim 2 wherein said casing is manufactured from acrylic.

5. The dosimeter according to claim 1 and further including a guard electrode surrounding said wire electrodes on said side wall.

6. The dosimeter according to claim 1 wherein said strip-like electrodes are formed by depositing a layer of conducting material in a required pattern by evaporation.

7. The dosimeter according to claim 1 wherein said strip-like electrodes are formed by depositing a layer of metal in a desired pattern by sputtering technique.

8. The dosimeter according to claim 6 or 7 wherein said striplike electrodes are formed of nickel.

9. The dosimeter according to claim 1 wherein a strip of each side wall extends beyond said casing and said electrodes are provided with connecting sections.

10. The dosimeter according to claim 9 wherein each strip is constructed as a connecting connector.

11. The dosimeter according to claim 9 or 10 wherein a strip of each side wall defines a recess with said casing extending lengthwise along outermost edges of said frame diagonally opposite one another.

12. The dosimeter according to claim 1 wherein said casing includes a side wall having a hole for inserting a tube for evacuating said oblong measuring chamber and wherein said tube is sealed after introduction of gas into said oblong measuring chamber.

13. The dosimeter according to claim 1 wherein said oblong measuring chamber is filled with xenon.

14. The dosimeter according to claim 13 wherein potential difference between said wire electrodes and said strip-like electrode elements during operation prevent gas multiplication.

15. The dosimeter according to claim 1 wherein said strip-like electrode elements extend obliquely with respect to said transverse direction of said oblong measuring chamber.

16. An apparatus for slit radiography, which comprises:

an X-ray source;

an X-ray detector collecting radiation passing through a body to be radiographed;

a slit diaphragm positioned between said X-ray source and said body for forming a planar X-ray beam;

a plurality of attenuating elements positioned along said slit diaphragm forming a plurality of attenuating sections;

means for scanning said body with said planar X-ray beam;

a detection member disposed in a path of said planar X-ray beam to measure ionizing radiation comprised of an oblong-shaped casing defining a gas-filled chamber said casing having at least two side walls formed of a material transparent to ionizing radiation, one side wall having a plurality of strip-like electrodes extending transversely to a longitudinal direction of said oblong-shaped casing, another side wall having wire electrodes extending in said longitudinal direction, said electrode capable of being connected to a source of electromotive force, each of said strip-like electrodes generating a signal representative of intensity of ionizing radiation, a group of said strip-like electrodes corresponding to a respective attenuating element;

means for moving said detection member in synchronization with said means for scanning said body with said planar X-ray beam; and means for simultaneously controlling each of said attenuating elements during scanning of said body in response to electric signals produced at respective groups of said strip-like electrodes.

17. The apparatus for slit radiography as defined in claim 16 wherein said casing includes an oblong frame mounted in a gas-tight manner between said side walls.

18. The apparatus for slit radiography as defined in claim 17 wherein said casing is manufactured from glass.

19. The apparatus for slit radiography as defined in claim 17 wherein said casing is manufactured from acrylic.

20. The apparatus for slit radiography as defined in claim 16 and further including a guard electrode surrounding said wire electrodes.

21. The apparatus for slit radiography as defined in claim 16 wherein said strip-like electrodes are formed by depositing a layer of conducting material in a required pattern by evaporation.

22. The apparatus for slit radiography as defined in claim 21 wherein said strip-like electrodes are formed of nickel.

23. The apparatus for slit radiography as defined in claim 16 wherein said strip-like electrodes are formed by depositing a layer of metal in a desired pattern by means of sputtering technique.

24. The apparatus for slit radiography as defined in claim 23 characterized in that said electrodes are formed of nickel. 32. The apparatus for slit radiography as defined in claim 16 wherein said detection member is mounted obliquely with respect to direction of scanning movement.

25. The apparatus for slit radiography as defined in claim 16 wherein a strip of each side wall extends beyond said casing and said electrodes are provided with connecting sections.

26. The apparatus for slit radiography as defined in claim 25 wherein each strip is constructed as a connecting connector.

27. The apparatus for slit radiography as defined in claim 25 or 26 wherein a strip of each side wall defines a recess with said casing extending essentially lengthwise of said frame along outermost edges of said frame diagonally opposite one another.

28. The apparatus for slit radiography as defined in claim 16 wherein said casing includes a side wall having a hole for inserting a tube for evacuating said measuring chamber and wherein said tube is sealed after introduction of gas into said measuring chamber.

29. The apparatus for slit radiography as defined in claim 16 wherein said measuring chamber is filled with xenon.

30. The apparatus for slit radiography as defined in claim 29 wherein said potential difference between said wire electrodes and said strip-like electrodes during operation prevent gas multiplication.

31. The apparatus for slit radiography as defined in claim 16 wherein said strip-like electrodes extend obliquely with respect to a transverse direction of said oblong measuring chamber.

32. The apparatus for slit radiography as defined in claim 16 wherein said detection member is mounted obliquely with respect to direction of scanning movement.

* * * * *

UNITED STATES PATENT AND TRADEMARK OFFICE
CERTIFICATE OF CORRECTION

PATENT NO. : 4,956,557

DATED : September 11, 1990

INVENTOR(S) : HUGO VLASBLOEM

It is certified that error appears in the above-identified patent and that said Letters Patent is hereby corrected as shown below:

In the Specification

Column 2, line 45, "vie", should read -- view --;

Column 3, line 12, before "electrical" insert -- electrodes 12 in an --.

Signed and Sealed this

Seventeenth Day of March, 1992

Attest:

HARRY F. MANBECK, JR.

*Attesting Officer*

*Commissioner of Patents and Trademarks*